United States Patent Office 3,177,548
Patented Apr. 13, 1965

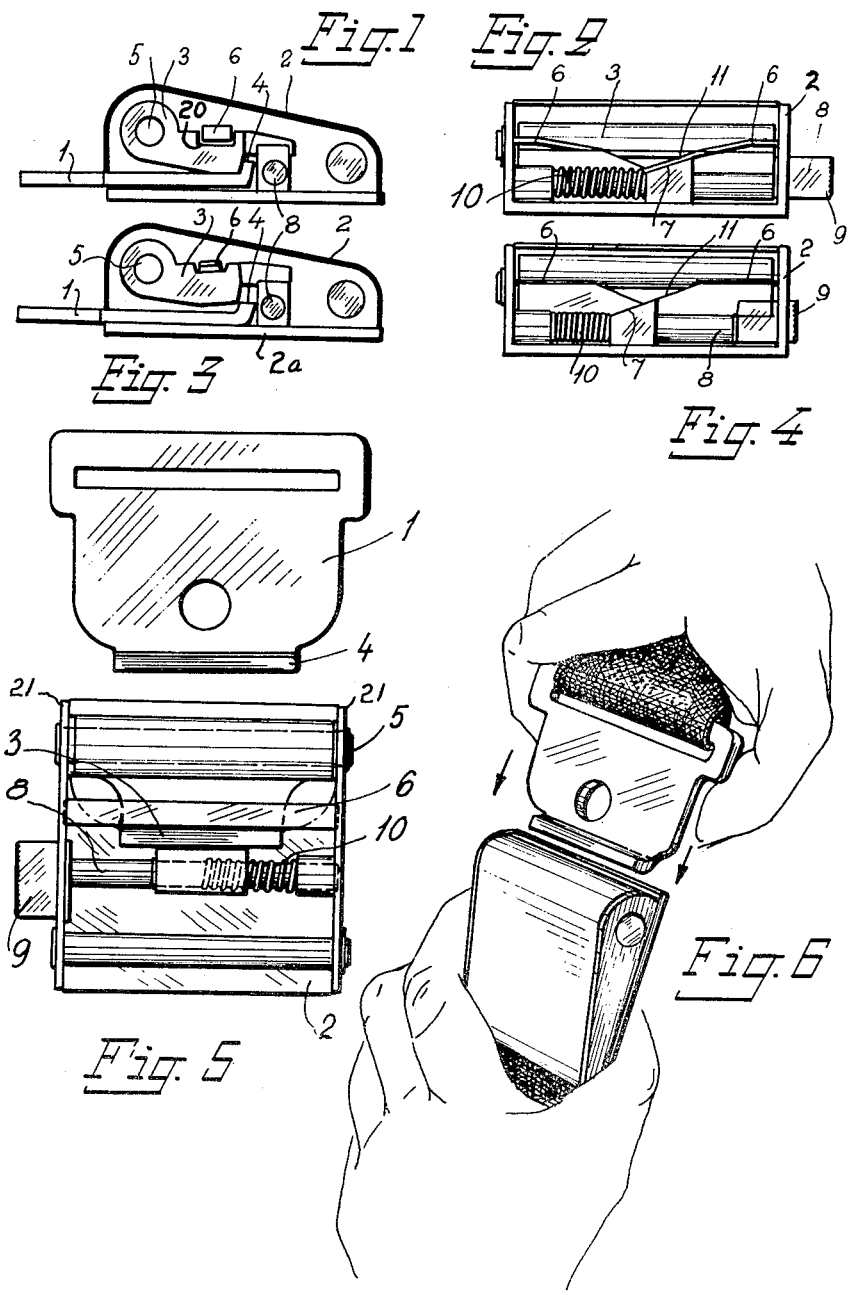

3,177,548
SEPARABLE FASTENER
Bror Allan Wiklund, Vikingstad, Sweden, assignor to Aktiebolaget Sjögrens Skyddsvante, Jamshog, Olofstrom, Sweden, a joint-stock company of Sweden
Filed Oct. 17, 1963, Ser. No. 317,016
1 Claim. (Cl. 24—230)

This invention relates to a locking device for the ends of a belt or strap and is primarily concerned with such a device for safety belts. As is well known, in certain situations at an accident it is vital for a person to be able to release the belt easily and quickly. The object of the invention is to provide a locking device or coupler for the ends of a belt or strap which device provides a firm and secure lock when the parts are engaged, but in which by a very simple manual action the parts can be released.

The device of this invention is of the kind consisting of two parts, namely a hook to one end of which the one belt end is fixed, and a housing into which the other end of the hook can be inserted, the housing having a locking means therein for engagement with the hook to lock the hook and housing together, release means being provided for instant release.

According to this invention the locking device is characterised in that the hook member consists of a flat plate having one end fixed to one belt end and its other end bent upwardly, and the housing for attachment to the other belt and has a flat base above which a swingable locking member is pivoted, said plate passing into the housing between the base and locking member, which is spring loaded towards the base, and is arranged to engage the plate end, manually operable means being provided to effect the swinging up of the locking member away from the base to release the plate.

Conveniently, the locking member consists of a lever pivoted on an axis transversely of the housing, i.e. at a right angle to the direction of movement of the plate, the free end of the lever being arranged to engage the bent up end of the plate to hold the plate in the housing.

Preferably, the release is effected by means of a slidable bar having a wedge shaped part adapted to co-operate with a corresponding part on the locking means whereby when the bar is slid, the locking means is moved clear of the end of the plate which can then be withdrawn from the housing.

In order that a clear understanding of the invention may be obtained, reference will now be made to the accompanying drawings, illustrating a preferred embodiment and in which:

FIGURE 1 is a sectional side view showing the hook locked in the housing,

FIGURE 2 is an end view,

FIGURE 3 is a view similar to FIGURE 1 showing the locking member raised,

FIGURE 4 is an end view of the parts in the position of FIGURE 3,

FIGURE 5 is a plan view of the hook and housing with the cover of the latter removed, and FIGURE 6 is a perspective view showing how the hook is inserted into the housing.

As shown in the drawings, the locking hook consists of a flat plate 1 arranged to be inserted into the housing 2 and be retained therein by the locking means or lever 3. The plate 1 has an upturned front end 4 set slightly obliquely, and the lock housing has a flat base 2a. The locking means consists of a lever 3 pivoted to swing at one end on an axle 5 transversely of the housing and the axle is located above the end 4 of the plate when said plate is fully inserted into the housing. A groove 20 is made in the upper surface of the lever 3, and a disc or blade spring 6 is provided seating in this groove 20, to press the lever downwardly.

The ends of the axle 5 are journalled in the side plates 21 of the housing at a location between the limit of insertion and the end of the housing into which the plate is inserted. The free end of the lever 3 is shaped to enter into the angle between the main part of the plate and its upturned end 4. The said upturned end preferably slopes from the vertical with respect to the plate at an angle of about 5°, and the end of the lever is correspondingly angled. In this way, if the strain on the belt is about 60 kg. the force required to operate the release mechanism does not exceed 9 kg.

The locking lever 3 is arranged to be released by means of a bar 8 having a wedge shaped pressure surface 7 and being displaceable transversely of the housing, one end of the bar 8 extending from the housing and terminating in a press plate or knob 9. The bar 8 can be displaced in a direction into the housing and transversely of the same against a spring 10, which spring effects return when the pressure on the plate or knob 9 is removed. A wedge shaped pressure surface 11 is provided on the free end of the lever 3 corresponding with the wedge shaped surface 7.

In use, the plate and housing are mated by gripping the houseing in one hand and the plate in the other as shown in FIG. 6 and inserting the plate into the housing. The underside of the lever is shaped so that said lever moves up as the plate is inserted, against the spring means 6, until the end 4 of the plate clears the nose of the lever when the lever is forced down by the said spring means so that the plate 1 and lever 3 are engaged as seen in FIGURE 1. As the axle 3 is journalled in the side plates of the housing above the end 4 and between the end of the housing in which the plate is inserted and the end 4 when in its locked position, the hook will be retained and locked, partly by the force of the said spring means and partly by the turning moment of the lever 3, which owing to the position of the axle 5, is effective in the same direction as the spring pressure.

In order to release the hook plate 1, the plate or knob 9 is pressed so that the bar 8 is moved axially against its spring 10 into the housing. The surface 7 presses on the surface 11 on the free end of the lever 3, swinging same upwardly against the pressure of the spring 6. The undersides of the lever 3 thereby clears the end of the part 4 permitting the plate to be withdrawn.

It will be understood that suitable guideways are provided on the inside of the housing so that the plate 1 is constrained during insertion or removal to be parallel with the base 2a of the housing. Also, the limit of insertion of the plate 1 is defined by a suitable stop or stops in the housing.

What I claim is:

A buckle for safety belts comprising, a flat housing having a flat base plate and upstanding side walls, a hook member insertable into the housing and engaged therein by a locking member, said hook member consisting of a flat plate having an upturned leading flange, a locking member contained within the housing and pivotally journalled on a pivot pin extending between the side walls thereof and only spaced slightly above the flat base, said locking member being spring-biased in a manner to pivot it toward the base plate of the housing, said locking member having a shoulder behind which the upturned flange of the hook member engages when said hook member is inserted into the housing under the locking member, the lowermost surface of said locking member being inclined with respect to the upper surface of said flat hook member to form a cam surface clear of said hook in locking position, a releasing bar slidable transversely of the housing, said bar being disposed inwardly of and beyond the upturned flange of the locking member as introduced into the housing to enable a mechanical advantage in releasing said flange from said locking member on rasing the latter, said bar having one end projecting from one of the side walls of the housing and having a wedge-shaped element located within the housing centrally between said upstanding walls, the locking member having a surface complementary to and disposed above the surface on the wedge-shaped element, and spring means operative on the bar to normally push the releasing bar in a direction to permit one end of said releasing bar to project from the side wall and restrain the wedge-shaped element from elevating the locking member but permitting the bar to be manually moved transversely of the housing in opposition to the force of the spring means, to thereby cause the wedge-shaped element, by its engagement with the complementary surface on the locking member, to forcibly elevate the locking member and remove its shoulder from engagement with the hook member, said complementary surfaces on said wedge-shaped member and said locking member being inclined by only a slight angle with respect to the base plate to insure a mechanical advantage in the releasing operation.

References Cited by the Examiner

UNITED STATES PATENTS

| | | | |
|---|---|---|---|
| 308,768 | 12/84 | Hazen | 24—230.1 |
| 1,104,207 | 7/14 | McCracken | 24—230.1 |
| 1,466,975 | 9/23 | Toelcke | 24—230.1 |
| 2,668,070 | 2/54 | Schmitt | 24—230.1 |
| 2,867,024 | 1/59 | Sepe | 24—230.1 |

FOREIGN PATENTS

| | | |
|---|---|---|
| 714,198 | 11/31 | France. |
| 8,855 | 4/02 | Great Britain. |

DONLEY J. STOCKING, *Primary Examiner.*

BERNARD A. GELAK, *Examiner.*